(12) United States Patent
Hsu et al.

(10) Patent No.: US 12,445,304 B2
(45) Date of Patent: *Oct. 14, 2025

(54) DATA VERIFICATION SYSTEM

(71) Applicant: AuthMe Co., Ltd., Taipei (TW)

(72) Inventors: Nai-Ho Hsu, Kaohsiung (TW);
Chi-Kuang Lee, Taipei (TW); Yu-Jen Chen, Kaohsiung (TW)

(73) Assignee: AuthMe Co., Ltd., Taipei (TW)

( * ) Notice: Subject to any disclaimer, the term of this patent is extended or adjusted under 35 U.S.C. 154(b) by 211 days.

This patent is subject to a terminal disclaimer.

(21) Appl. No.: 18/369,639

(22) Filed: Sep. 18, 2023

(65) Prior Publication Data

US 2024/0007302 A1  Jan. 4, 2024

Related U.S. Application Data

(62) Division of application No. 16/890,129, filed on Jun. 2, 2020, now Pat. No. 11,764,970.

(30) Foreign Application Priority Data

Jun. 3, 2019  (TW) ................................. 108119235

(51) Int. Cl.
*H04L 29/06* (2006.01)
*H04L 9/08* (2006.01)
(Continued)

(52) U.S. Cl.
CPC .......... *H04L 9/3247* (2013.01); *H04L 9/0825* (2013.01); *H04L 9/3231* (2013.01); *H04L 67/1097* (2013.01)

(58) Field of Classification Search
CPC ... H04L 9/3247; H04L 9/0825; H04L 9/3231; H04L 67/1097; H04L 63/126;
(Continued)

(56) References Cited

U.S. PATENT DOCUMENTS 6,097,035 A * 8/2000 Belongie ............ G06V 40/1335
250/556
9,473,820 B2 * 10/2016 Mallinson .......... H04N 21/8133
(Continued)

FOREIGN PATENT DOCUMENTS

CN  103955642 A * 7/2014 ............. G06F 21/32
CN  108182424 B * 5/2020 ............. G06F 3/041
(Continued)

*Primary Examiner* — Sher A Khan
(74) *Attorney, Agent, or Firm* — ScienBiziP, P.C.

(57) ABSTRACT

A data verification system includes a provider-end apparatus and a request-end apparatus. The provider-end apparatus receives a request of data from the request-end apparatus, retrieves a data cluster designated in the request of data, executes a first fingerprint process on an unrequested part of the data cluster to obtain an unrequested data fingerprint, and returns a requested part of the data cluster and the unrequested data fingerprint to the request-end apparatus. The request-end apparatus retrieves a trusty collective data fingerprint of the data cluster, executes the first fingerprint process on the requested part for obtaining a request data fingerprint, executes a merging process on the unrequested data fingerprint and the request data fingerprint for obtaining a merges collective data fingerprint, and determines that the requested part is correct when the merged collective data fingerprint is consistent with the trusty collective data fingerprint.

10 Claims, 9 Drawing Sheets

(51) Int. Cl.
*H04L 9/32* (2006.01)
*H04L 67/1097* (2022.01)

(58) Field of Classification Search
CPC ... H04L 63/0428; H04L 63/123; H04L 63/00; H04L 9/3263; G06F 21/645; G06F 21/32
See application file for complete search history.

(56) References Cited

U.S. PATENT DOCUMENTS

| | | | | |
|---|---|---|---|---|
| 9,697,217 | B1* | 7/2017 | Salyers | G06F 16/137 |
| 2002/0169971 | A1* | 11/2002 | Asano | G11B 20/0021 |
| | | | | 713/168 |
| 2003/0152253 | A1* | 8/2003 | Wong | G06V 40/1347 |
| | | | | 382/124 |
| 2007/0168672 | A1* | 7/2007 | Izu | H04L 9/3073 |
| | | | | 713/176 |
| 2008/0205714 | A1* | 8/2008 | Benkley | G06V 40/1306 |
| | | | | 382/126 |
| 2011/0099200 | A1* | 4/2011 | Blount | H04L 63/123 |
| | | | | 714/E11.03 |
| 2013/0246378 | A1* | 9/2013 | Hearnden | H04L 63/12 |
| | | | | 707/698 |
| 2014/0298034 | A1* | 10/2014 | Watanabe | H04L 9/3247 |
| | | | | 713/176 |
| 2015/0089234 | A1* | 3/2015 | Kaluzhny | G06F 21/85 |
| | | | | 713/176 |
| 2015/0281225 | A1* | 10/2015 | Schoen | H04L 63/08 |
| | | | | 726/9 |
| 2016/0314337 | A1* | 10/2016 | Suh | G06V 10/431 |
| 2017/0235640 | A1* | 8/2017 | Lee | H04L 67/10 |
| | | | | 707/634 |
| 2018/0211093 | A1* | 7/2018 | Bae | G06V 40/1335 |
| 2020/0019623 | A1* | 1/2020 | Wong | G06F 16/137 |

FOREIGN PATENT DOCUMENTS

| | | | | |
|---|---|---|---|---|
| EP | 1681609 A1 * | 7/2006 | | G06F 11/07 |
| JP | 2010166549 A * | 7/2010 | | |
| WO | WO-2012008885 A1 * | 1/2012 | | G06V 40/1335 |

* cited by examiner

DATA VERIFICATION SYSTEM

RELATED APPLICATIONS

The present application is a divisional application of application Ser. No. 16/890,129 and claims priority to Taiwanese Application Number 108119235, filed Jun. 3, 2019, the disclosure of which is hereby incorporated by reference herein in its entirety.

BACKGROUND OF THE INVENTION

1. Technical Field

The present invention relates to verification and transmission of data, and more particularly to a data verification system for verifying partial data based on collective certificate.

2. Description of Related Art

For receiver ends to verify data they receive for correctness, there have been a technology of collective data verification.

Specifically, plural initial data are stored at the provider end, and a fair third party holds data fingerprints of the initial data. When receiving the initial data from the provider end, a receiver end may retrieve the data fingerprint of the initial data from the third party, and use the data fingerprint to verify whether the received initial data is accurate and correct.

Thereby, the existing technology of collective data verification may be useful for a receiver end to verify data correctness. Additionally, since the data fingerprint is generated by encrypting the initial data, the third party is prevented from recovering the initial data from the data fingerprint, thereby improving data security.

However, the existing technology of collective data verification has some shortcomings. When the receiver end merely requests for a part of initial data, for enabling the receiver end to verify the received data, the provider end still has to send the entire initial data to the receiver end, yet this raise the risk that the receiver accesses the unrequested part of the data cluster of the initial data, and in turn increase the risk of unexpected disclosure of the initial data.

In addition, since the initial data usually has a large quantity of sub-data, if all the data fingerprints of the sub-data of the initial data have to be stored at the third party, considerable consumption of storage space is expected.

Therefore, the existing technology of collective data verification cannot verify partial data a described above, and thus there is a need for a more effective approach.

SUMMARY OF THE INVENTION

The primary objective of the present invention is to provide a data verification system for verifying partial data based on collective certificate, which uses a data fingerprint of complete data to verify partial data.

To achieve the foregoing objective, the present invention provides a data verification system comprises a provider-end computer apparatus and a request-end computer apparatus. The provider-end computer apparatus is configured to: receive a request of data from the request-end computer apparatus; retrieve a data cluster designated in the request of data; execute a first fingerprint process on an unrequested part of the data cluster, which includes everything in the data cluster other than a requested part so as to obtain an unrequested data fingerprint; and return the requested part of the data cluster and the unrequested data fingerprint to the request-end computer apparatus. The request-end computer apparatus is configured to: retrieve a trusty collective data fingerprint of the data cluster, wherein the trusty collective data fingerprint is generated based on the entire data cluster; execute the first fingerprint process on the requested part of the data cluster for obtaining a request data fingerprint; execute a merging process on the unrequested data fingerprint and the request data fingerprint for obtaining a merges collective data fingerprint; and determine that the requested part of the data cluster is correct when the merged collective data fingerprint is consistent with the trusty collective data fingerprint.

The present invention may effectively verify the requested part of data for correctness.

DETAILED DESCRIPTION OF THE INVENTION

For further illustrating the means and functions by which the present invention achieves the certain objectives, the following description, in conjunction with the accompanying drawings and preferred embodiments, is set forth as below to illustrate the implement, structure, features and effects of the subject matter of the present invention.

For the purpose of this disclosure, a "data cluster" refers to aggregation of a plurality of sub-data, wherein each sub-data can be accessed independently, and has informative meaning (e.g. name information, address information, file documents and so on).

A "data fingerprint" is generated by executing a fingerprint process on designated data (whether sub-data or a data cluster), and may be used to verify the designated data for integrity and/or correctness. In one embodiment, a data fingerprint may be a hash value, and the fingerprint process includes an operation process of a hash function. In one embodiment, data of different sizes, after undergoing the fingerprint process, may produce data fingerprints that are of the same length but have different contents.

Figure 1:
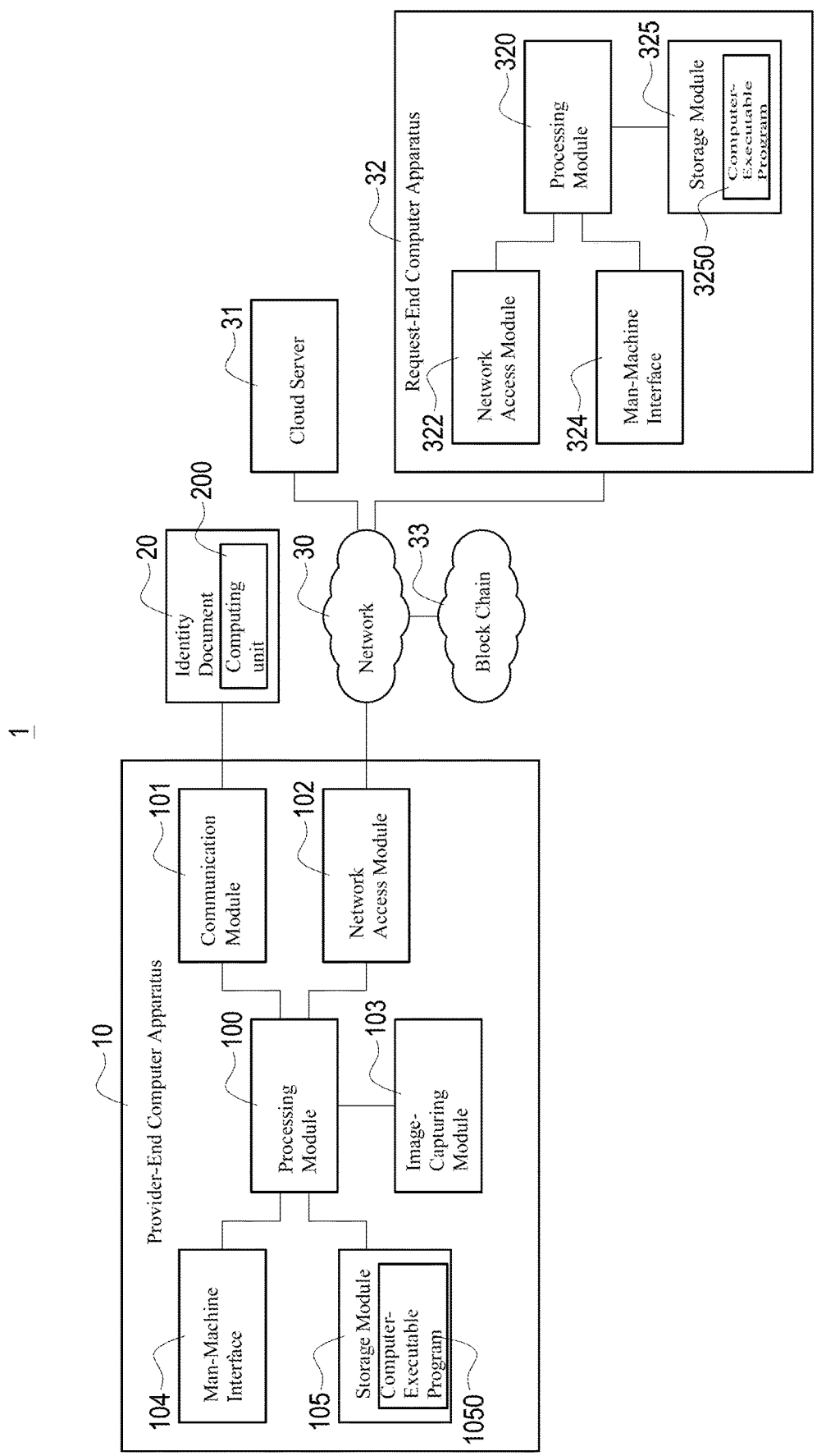
FIG. 1 is a structural diagram of a data verification system according to one embodiment of the present invention.

FIG. 1 is a structural diagram of a data verification system according to one embodiment of the present invention. The present invention discloses a method of verifying partial data based on collective certificate using the data verification system 1. The present invention allows a request-end computer apparatus 32 to verify a part of a data cluster be means of a trusty collective data fingerprint. The trusty collective data fingerprint is used for collective certificate. In other words, it is traditionally designed for verification of complete data clusters and cannot be used to verify a part of a data cluster directly.

The data verification system 1 includes a provider-end computer apparatus 10 and a request-end computer apparatus 32. The provider end computer apparatus 10 and the request-end computer apparatus 32 (such as a smartphone, a wearable device, a tablet, a laptop computer, a server, etc.) may belong to the user or may be network server, and are connected to each other through the network 30 for data transmission.

Specifically, fore retrieving a designated data cluster or its part, the request-end computer apparatus 32 may generate a request of data to ask the provider-end computer apparatus 10 to provide the designated part of the designated data cluster. Then the provider-end computer apparatus 10 may return the designated data cluster or its part to the request-end computer apparatus 32 according to the request of data.

The provider-end computer apparatus 10 primarily comprises a network access module 102, a man-machine interface 104, a storage module 105 and a processing module 100 electrically connected to the foregoing modules.

The request-end computer apparatus 32 primarily comprises including a network access module 322 for connecting the network 30, a storage module 325, a man-machine interface 324 and a processing module 320 electrically connected to the foregoing components.

The network access module 102 and the network access module 322 (such as a mobile network module, a Wi-Fi module or an Ethernet module) are for connecting the network 30 (such as the Internet) so as to allow data communication. The man-machine interface 104 and the man-machine interface 324 (e.g. an input module such as a keypad module and a touch control module and/or an output module such as a display module and an indication lamp) serve to receive the user's operation and provide the user with information. The storage module 105 and the storage module 325 serve to store data. The processing module 100 serves to control the provider-end computer apparatus 10. The processing module 320 serves to control the request end computer apparatus 32.

In one embodiment, the storage module 105 of the provider-end computer apparatus 10 and the storage module 325 of the request end computer apparatus 32 may each include a non-transitory storage medium. The non-transitory storage media store computer-executable programs 1050, 3250 (such as applications), respectively. The computer-executable programs 1050, 3250 each have a computer-executable code. When the provider-end computer apparatus 10 executes the computer-executable program 1050 and the request-end computer apparatus 32 executes the computer-executable program 3250, the two may interact through the network 30, thereby realizing the methods as provided in various embodiments of the present invention.

For example, the provider-end computer apparatus 10 may be a computer apparatus belonging to the user, and the request-end computer apparatus 32 is a network server (such as that for an on-line shop or an identity verification website). When the provider-end computer apparatus 10 receives a request of data (such as a request for provision of the requested part of the data cluster identity data) from the request-end computer apparatus 32, it may provide the requested data and the related verification data to the request-end computer apparatus 32 using the partial data verification method as detailed later, so that the request-end computer apparatus 32 after receiving the request data may perform verification on it for integrity and correctness.

In another instance, the provider-end computer apparatus 10 may be a server providing service of data downloading, and the request-end computer apparatus 32 is a computer apparatus belonging to the user. When the provider-end computer apparatus 10 receives a request of data (such as a request for provision of a particular part of a data cluster) from the request-end computer apparatus 32, it may provide the requested data and the related verification data to the request-end computer apparatus 32 using the partial data verification method as detailed later, so that the request-end computer apparatus 32 after receiving the request data may perform verification on it for integrity and correctness.

Figure 2:
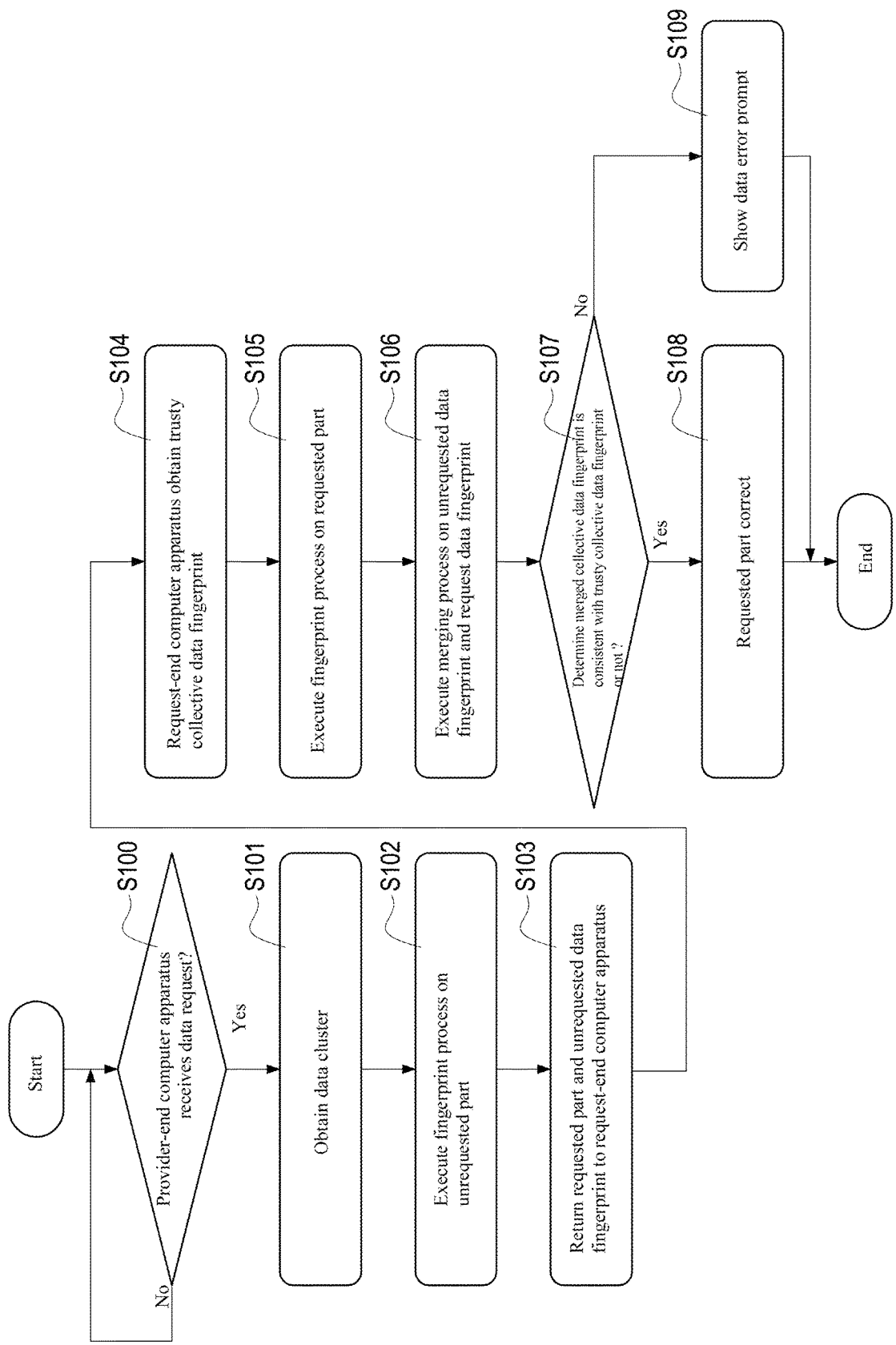
FIG. 2 is a flowchart of a partial data verification method according to a first embodiment of the present invention.
Figure 3:
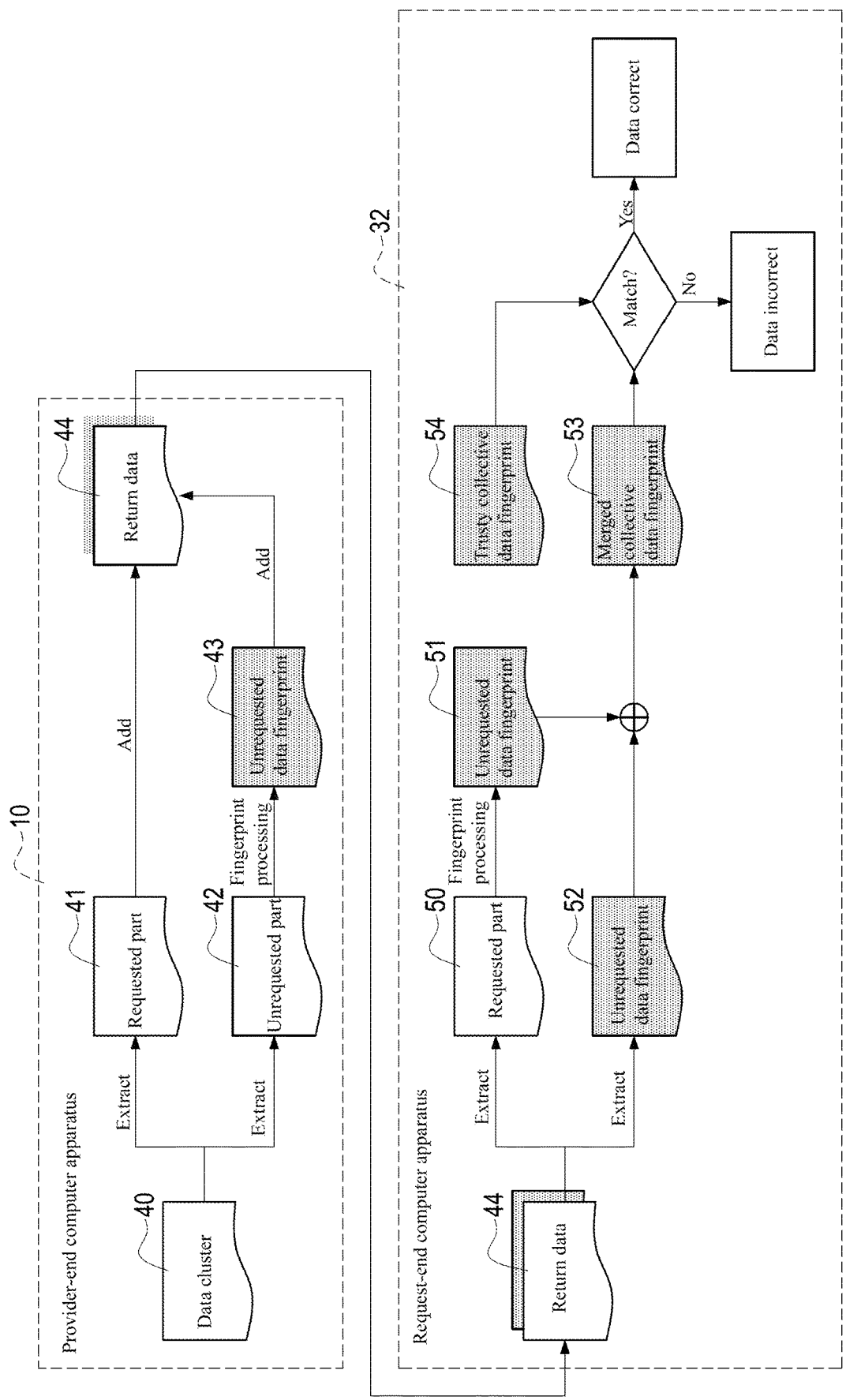
FIG. 3 is a schematic illustration of partial data verification according to one embodiment of the present invention.

Please refer to FIG. 1, FIG. 2 and FIG. 3. FIG. 2 is a flowchart of a partial data verification method according to a first embodiment of the present invention. FIG. 3 is a schematic illustration of partial data verification according to one embodiment of the present invention. The following description of the partial data verification method of the present embodiment will be made with reference to FIG. 3 as an example. However, the present invention is not limited thereto. The partial data verification method of the present embodiment includes the following steps.

In Step S100, the processing module 100 of the provider-end computer apparatus 10 determines whether it receives a request of data from the request-end computer apparatus 32. The request of data requests for provision of a part of the data cluster 40 (such as the requested part of the data cluster 41).

If the processing module 100 receives a request of data, it executes Step S101. Otherwise, the processing module 100 executes Step S100 again.

In Step S101, the processing module 100 retrieves request of data the designated data cluster 40.

In one embodiment, the storage module 105 keeps plural data clusters 40. The processing module 100 reads the designated data cluster 40 from the storage module 105 according to the request of data.

In one embodiment, the plural data clusters 40 are stored in an external apparatus (such as an identity document 20, a cloud server 31 or a block chain 33). The processing module 100 retrieves the designated data cluster 40 from the external apparatus according to the request of data. For example, it retrieves the data cluster 40 from the cloud server 31 or the block chain 33 through the network 30. Alternatively, it retrieves the data cluster 40 from the computing unit 200 of the identity document 20 through the communication module 101, without limitation.

In Step S102, the processing module 100 groups the data cluster 40 according to the request of data, so as to extract the requested part 41 and the unrequested part 42 which includes everything in the data cluster other than the requested part 41. Additionally, the processing module 100 executes a fingerprint process (i.e. the first fingerprint process) on the unrequested part 42 for obtaining the unrequested data fingerprint 43.

In Step S103, the processing module 100 returns the requested part of the data cluster 41 and unrequested data fingerprint 43 the data cluster 40 to the request-end computer apparatus 32 through the network 30.

In one embodiment, the processing module 100 may add the requested part 41 and the unrequested data fingerprint 43 to the return data 44, and transfer the return data 44 to the request-end computer apparatus 32.

Then the request-end computer apparatus 32 executes the following steps when receiving the return data 44. In Step S104, the processing module 320 retrieves the trusty collective data fingerprint 54 of the data cluster 40. The foregoing trusty collective data fingerprint is generated based on the entire data cluster.

In one embodiment, the foregoing trusty collective data fingerprint may be retrieved from a data fingerprint library of a third party, or may be retrieved from a provider-end computer apparatus 10, or may be stored in the storage module 325 of the request-end computer apparatus 32 in beforehand, without limitation.

In one embodiment, the foregoing trusty collective data fingerprint is designed to be transmitted over the network, meaning that it may be held by plural request-end computer apparatuses 32 simultaneously. It may be unencrypted or can be decrypt at the request-end computer apparatuses 32.

In Step S105, the processing module 320 analyzes the received return data 44 to extract the requested part 50 and the unrequested data fingerprint 52. Afterward, the processing module 320 executes a fingerprint process (i.e. the first fingerprint process) that is identical or similar to Step S102 on the requested part of the data cluster 50 for obtaining the request data fingerprint 51.

In Step S106, the processing module 320 executes a merging process on the unrequested data fingerprint 52 and the request data fingerprint 51 for obtaining the merged collective data fingerprint 53.

It is worthy to be noted that the foregoing merging process corresponds to the way by which the trusty collective data fingerprint is generated. For example, if the trusty collective data fingerprint is generated by hashing the data cluster, the foregoing merging process including hashing. In another instance, if the trusty collective data fingerprint is generated by partially sampling the data cluster, the foregoing merging process includes a partially sampling process.

In one embodiment, the foregoing merging process may include hashing. For example, hashing may be executed on the unrequested data fingerprint 52 and the request data fingerprint 51 for obtaining hash values, and these hash values are used as the merges collective data fingerprint 53.

In one embodiment, the merging process may include an assembling process to assemble, for example, the unrequested data fingerprint 52 and the request data fingerprint 51, and then uses the assembled data as the merged collective data fingerprint 53.

In Step S107, the processing module 320 determines whether the merged collective data fingerprint 53 is consistent with trusty collective data fingerprint 54.

If the merged collective data fingerprint 53 is consistent with trusty collective data fingerprint 54, the processing module 320 executes Step S108. Otherwise, the processing module 320 executes Step S109.

In Step S108, the processing module 320 determines that the requested part of the data cluster 50 of the data cluster 40 it receives is accurate and correct, and may further show a "data correct" prompt through the man-machine interface 324.

In Step S109, the processing module 320 determines that the requested part 50 of the data cluster 40 it receives is incorrect or incomplete, and further shows a "data error" prompt through the man-machine interface 324.

Thereby, the present invention may use a trusty collective data fingerprint for verifying the entire data cluster to verify a requested part of the data cluster for correctness and integrity. Additionally, the present invention eliminates the need for additional storage space for otherwise preloading the data fingerprints of different parts of the data cluster.

Figure 4:
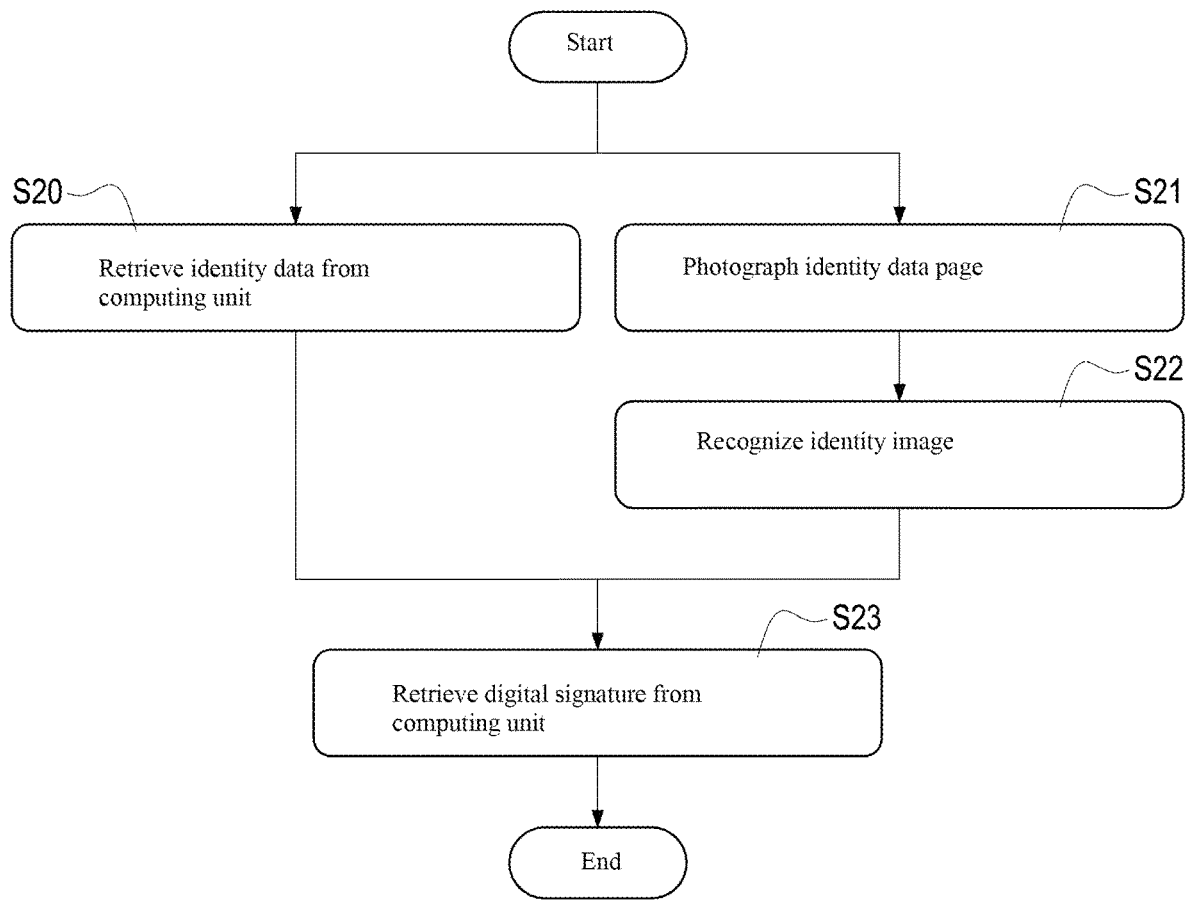
FIG. 4 is a flowchart of data extraction according to a second embodiment of the present invention.
Figure 5:
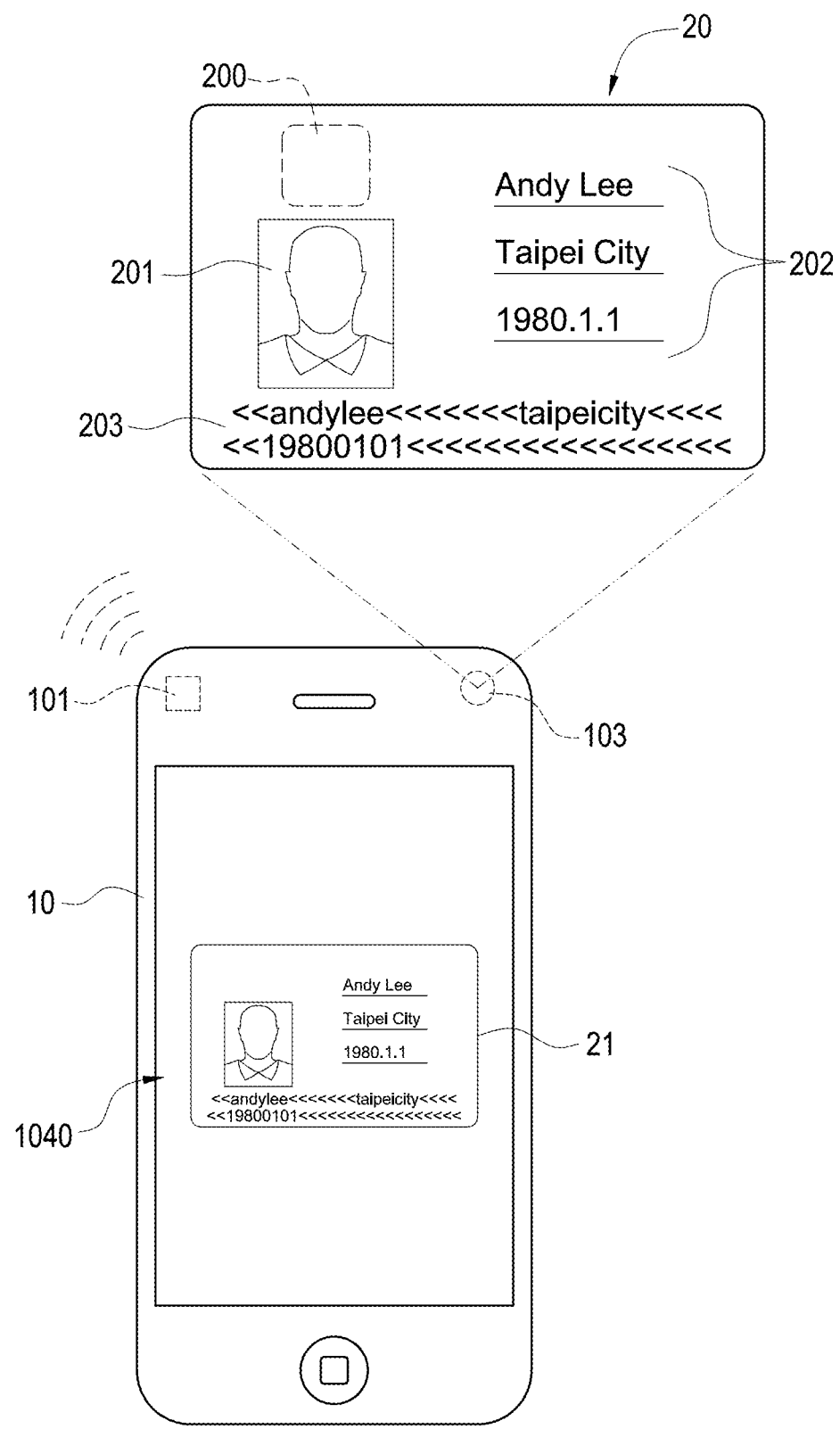
FIG. 5 is a schematic illustration data extraction according to one embodiment of the present invention.

Please refer to FIG. 1, FIG. 2, FIG. 4 and FIG. 5. FIG. 4 is a flowchart of data extraction according to a second embodiment of the present invention. FIG. 5 is a schematic illustration data extraction according to one embodiment of the present invention. In the present embodiment, the provider-end computer apparatus 10 is a computer apparatus belonging to the user, and the request-end computer apparatus 32 is a network server (such as that for an on-line shop or an identity verification website). The request of data requests the provider-end computer apparatus 10 to provide a part of the user's identity data (i.e. the data cluster).

Additionally, in the present embodiment, the provider-end computer apparatus 10 may include a communication module 101 electrically connected to the processing module 100 and an image-capturing module 103 (such as a camera) for photographing an external image.

The communication module 101 is configured to establish near-field (including contact) communication with the computing unit 200 of the identity document 20 (such as a processor chip). In one embodiment, the communication module 101 may be a wireless near-field communication module, such as an NFC module, a Bluetooth module, an ultrasonic module and the like. Alternatively, it may be a contact communication module, such as a contact IC card reader. Moreover, the identity document 20 may include a communication interface electrically connected to the computing unit 200. The communication interface uses a communication technology compatible with the communication module 101 so as to perform data communication with the communication module 101.

Figure 6A:
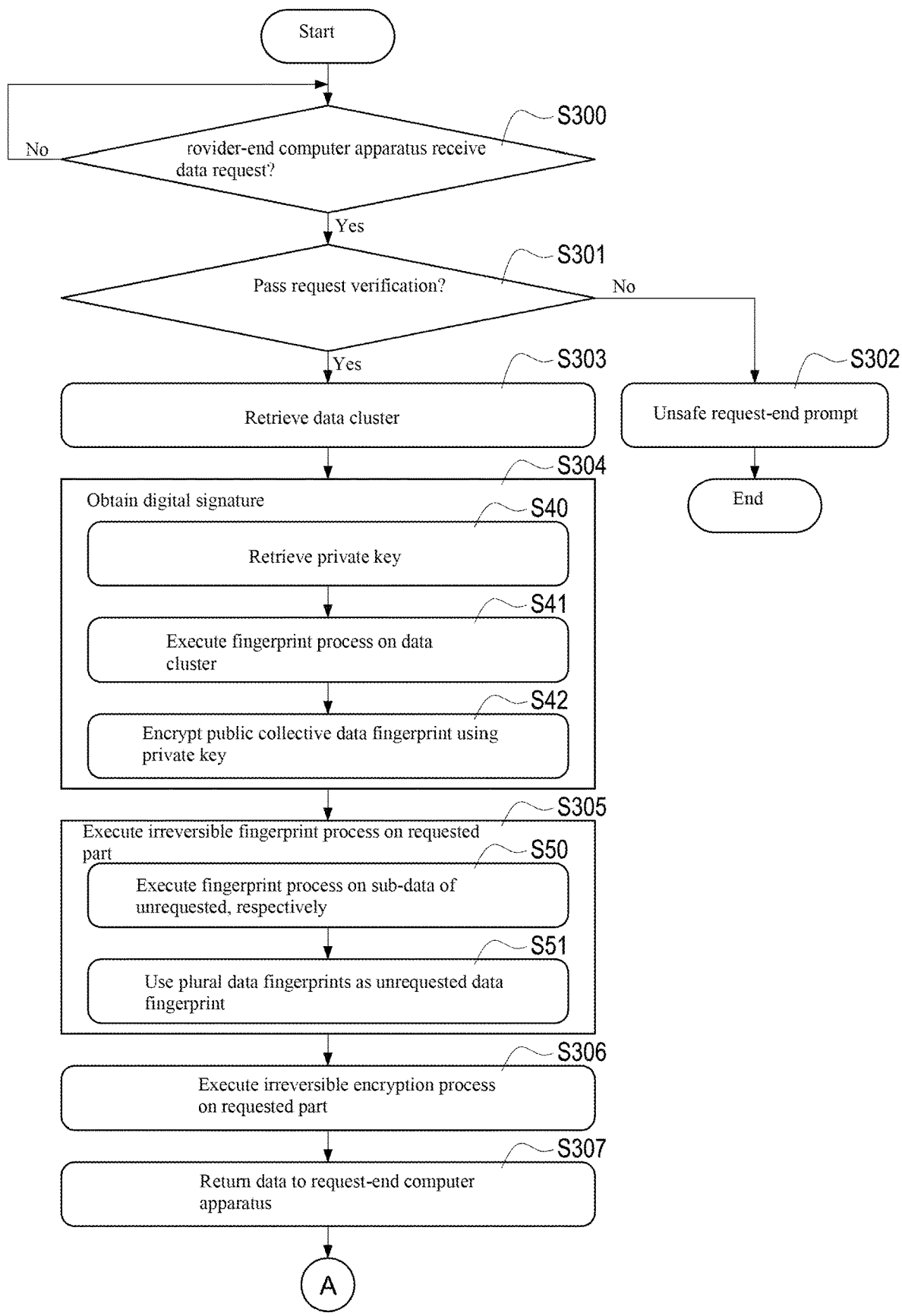
FIG. 6A is a first flowchart of a partial data verification method according to a third embodiment of the present invention.
Figure 6B:
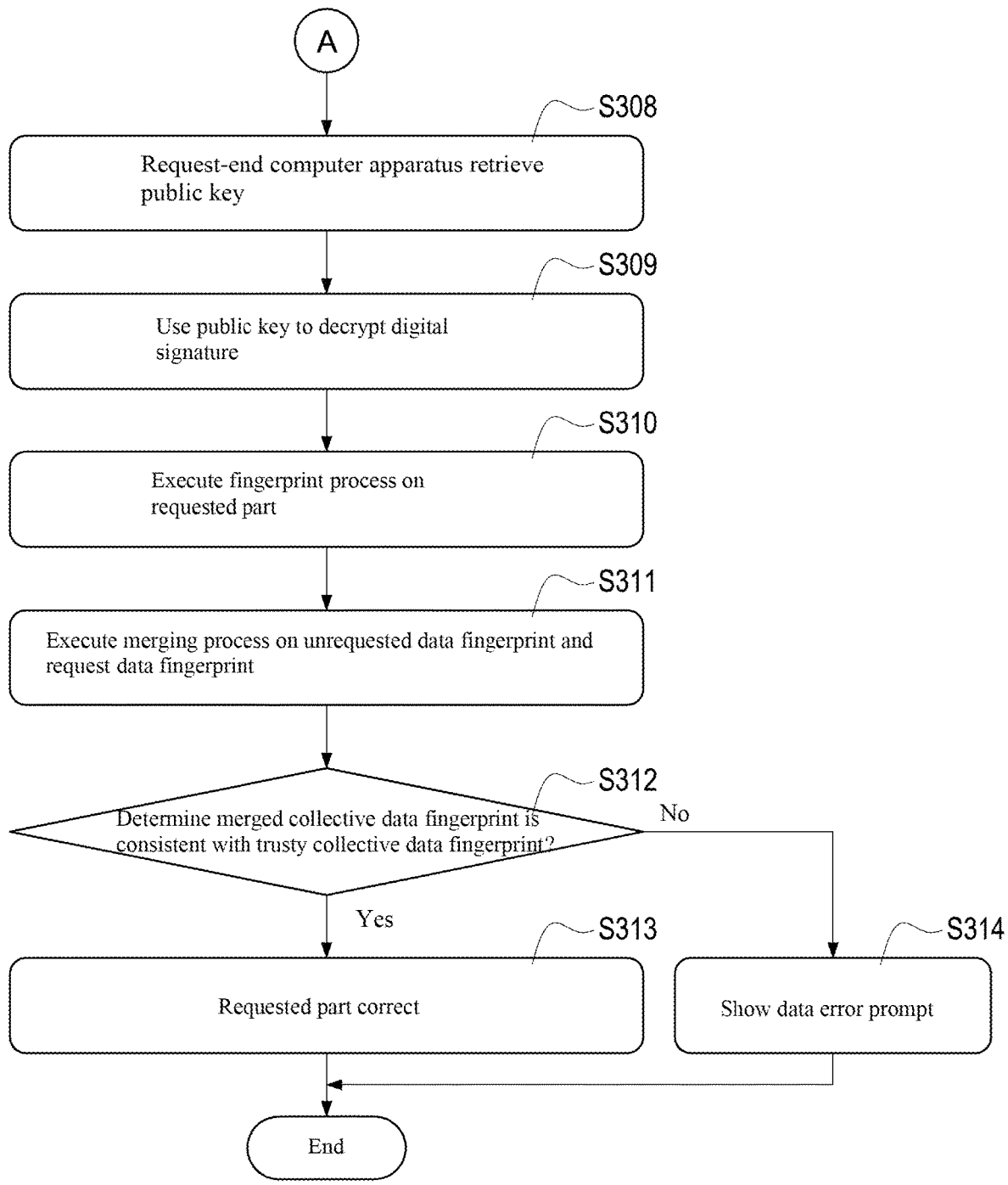
FIG. 6B is a second flowchart of the partial data verification method according to the third embodiment of the present invention.

In the present embodiment, electronic data transmission technology (in Step S20) or optical image recognition technology (in Steps S21-S22) may be used to acquire the data cluster. The partial data verification method of the present embodiment acquires the data cluster and the digital signature (whose use will be detailed with reference to FIG. 6A and FIG. 6B) through the following steps.

In Step S20, the processing module 100 of the provider-end computer apparatus 10 retrieves the users identity data from the computing unit 200 of the identity document 20 as the data cluster.

For example, as shown in FIG. 5, the communication module 101 is an NFC module. The user may put the identity document 20 close to the communication module 101, which has been enabled, for near-field communication. Thereby, the processing module 100 may request for embedded identity data from the computing unit 200 through the communication module 101 and the NFC interface while powering the computing unit 200 and the NFC interface). The computing unit 200 can then return the embedded identity data to the provider-end computer apparatus 10 and use it as the data cluster.

In another instance, the communication module 101 is a contact IC card reader. The user may insert the identity document 20 into the communication module 101 to make the communication module 101 contact the computing unit 200. Thereby, the provider-end computer apparatus 10 may retrieve the identity data from the computing unit 200 and use it as the data cluster.

In Step S21, the processing module 100 photographs the identity data page of the identity document 20 using the image-capturing module 103 for obtaining identity image.

In one embodiment, as shown in FIG. 5, the identity document 20 belonging to the user has an identity data page in a printed form. The identity data page may include the user's photograph 201, a variety of field data 202 of the users identity data. In the example shown in FIG. 5, the user's name is Andy Lee, born on Jan. 1, 1980, and the document was issued in Taipei City. The user may operate the provider-end computer apparatus 10 to use the image-capturing module 103 to photograph the identity data page of the identity document 20 for obtaining the identity image 21. In addition, the provider-end computer apparatus 10 may use the display module 1040 to show the photographed identity image 21 in a real-time manner for the user to check the image quality.

In Step S22, the processing module 100 executes a recognition process on the identity image 21 for obtaining identity data and uses it as the data cluster.

In one embodiment, processing module 100 may execute an optical character recognition process on the obtained identity image to recognize plural characters and their arrangement in the identity image 21, and further execute an identity analysis process on the recognized characters and their arrangement so as to obtain the identity data through analysis of the plural characters and their arrangement.

In Step S23, the processing module 100 retrieves the digital signature from the computing unit 200 through the communication module 101. The digital signature is pre-loaded in the computing unit 200, and is used to verify the identity data for overall correctness and integrity.

In one embodiment, identity data page may of the identity document 20 further records a machine-readable code 203. The processing module 100 recognizes the machine-readable code 203 form the identity image 21, and then uses the machine-readable code 203 to unlock the computing unit 200, so as to make the computing unit 200 permit provision of the identity data.

Thereby, the present invention can retrieve users' identity data safely and conveniently.

Figure 7A:
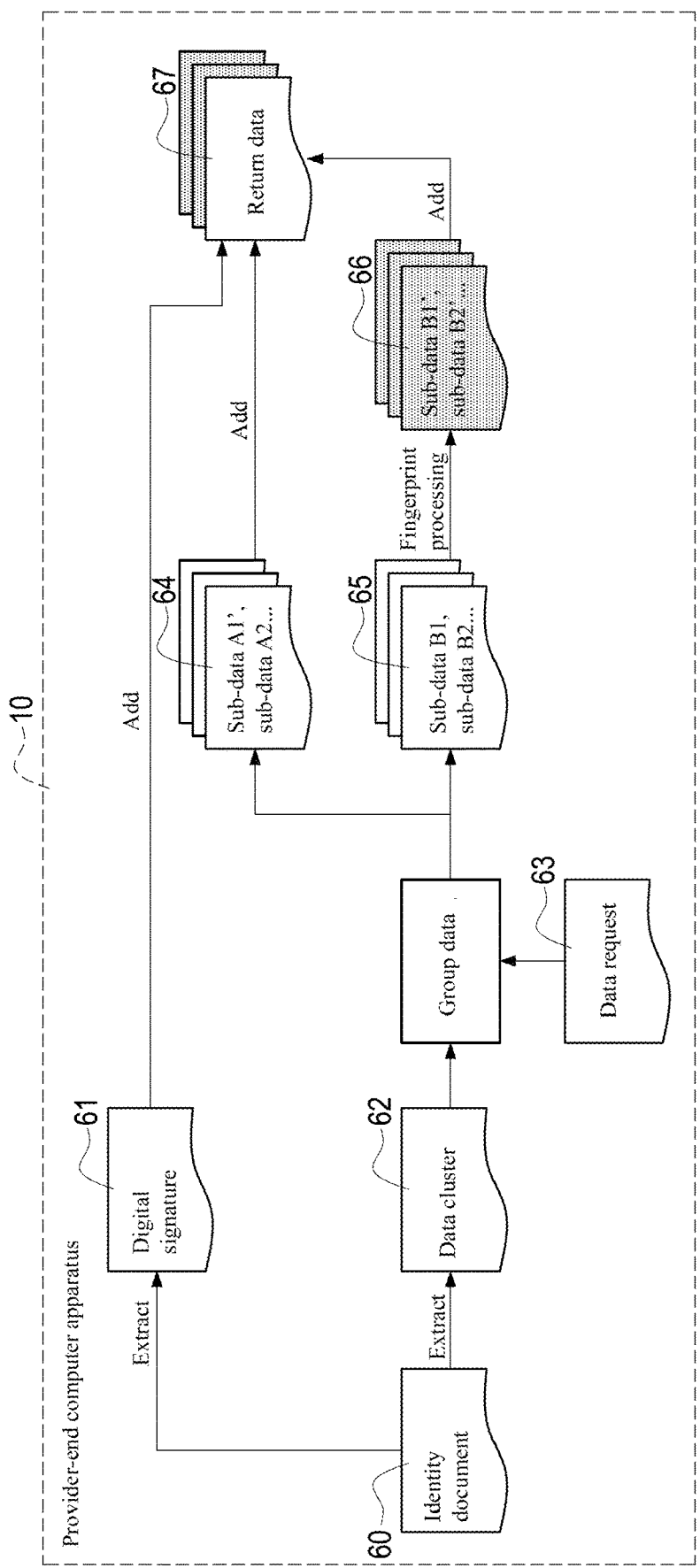
FIG. 7A is a first schematic illustration of partial data verification according to one embodiment of the present invention.
Figure 7B:
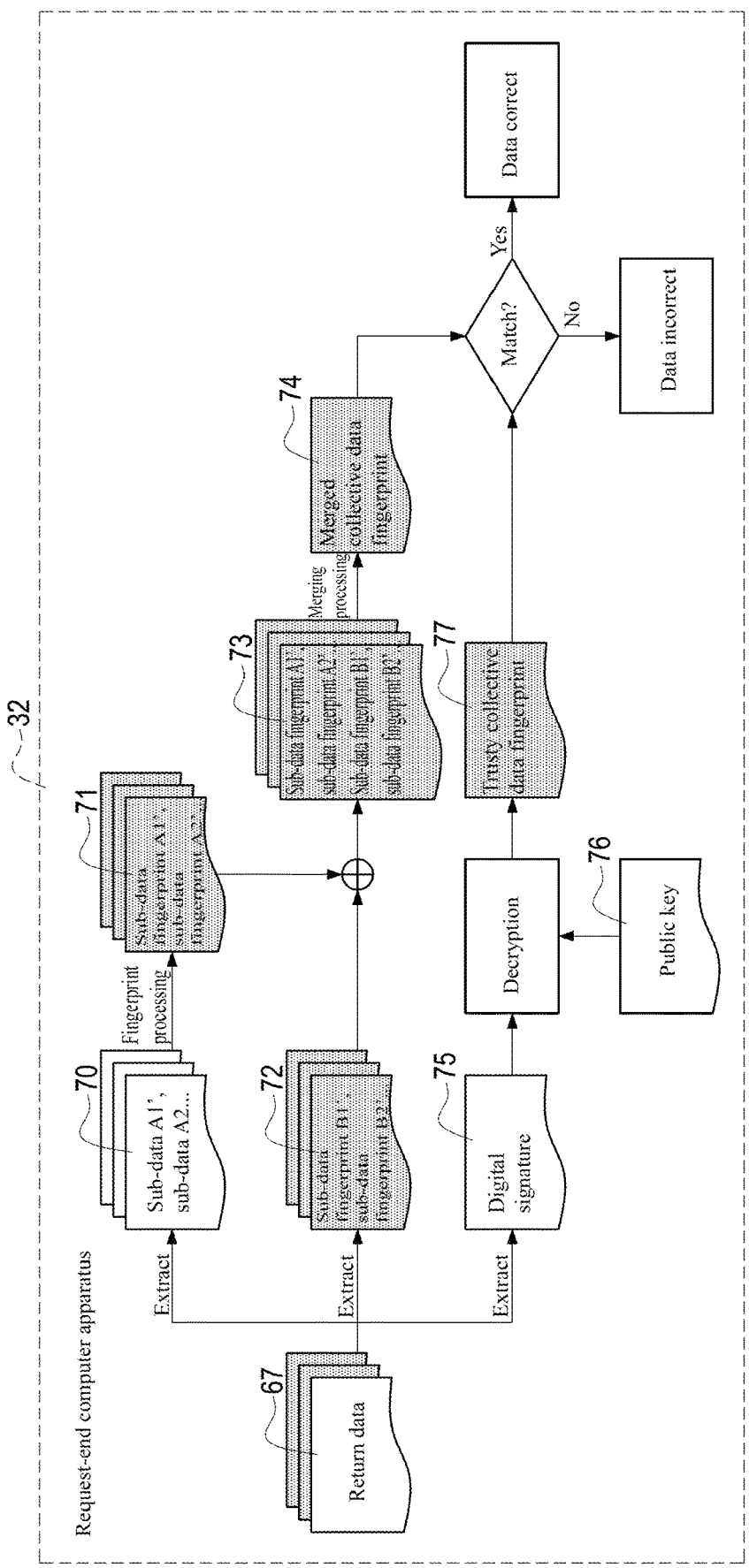
FIG. 7B is a second schematic illustration of partial data verification according to one embodiment of the present invention.

Referring to FIG. 1, and FIG. 6A through FIG. 7B, FIG. 6A is a first flowchart of a partial data verification method according to a third embodiment of the present invention. FIG. 6B is a second flowchart of the partial data verification method according to the third embodiment of the present invention. FIG. 7A is a first schematic illustration of partial data verification according to one embodiment of the present invention. FIG. 7B is a second schematic illustration of partial data verification according to one embodiment of the present invention.

Compared to the partial data verification method as shown in FIG. 2, the partial data verification method of the present embodiment incorporates digital signature technology for transmission of the trusty collective data fingerprint. Additionally, the present embodiment further provides preferred mode of a fingerprint process. The partial data verification method of the present embodiment includes the following steps.

In Step S300, the processing module 100 of the provider-end computer apparatus 10 determines whether it receives a request of data 63 from the request-end computer apparatus 32. The request of data request for provision of a request part 64 of the data cluster 62 (including sub-data A1, sub-data A2 . . . ).

If the processing module 100 receives the request of data 63, it executes Step S301. Otherwise, the processing module 100 executes Step S300 again.

In Step S301, the processing module 100 executes a request-end verification process on the request end digital signature of the request of data 63. Specifically, the request of data 63 may include a request end digital signature that is used to verify the request-end computer apparatus 32 for identity.

If the request of data 63 fails in request-end verification, which means that the request end digital signature is wrong or illegal, the processing module 100 executes Step S302. The processing module 100 shows an "unsafe request end" prompt through the man-machine interface 104, and stops data transmission to prevent data leakage.

If the processing module 100 determines that the request of data 63 passes request-end verification, which means that the request of data 63 is issued by a legal, secure or known request-end computer apparatus 32, it executes Step S303, the processing module 100 retrieves the data cluster 62. The data cluster 62 may include a plurality of sub-data (such as sub-data A1, A2 . . . and sub-data B1, B2 . . . ).

In one embodiment, if the requested data cluster 62 is the user's identity data, the process module 100 may extract the identity data from the identity document 60 as the data cluster 62.

In Step S304, the processing module 100 retrieves the digital signature 61 of the data cluster 62.

In one embodiment, the digital signature is retrieved from an external apparatus, such as an external computer apparatus (e.g. a request-end computer apparatus 32, a cloud server 31, which may be a third party server or a database, or a block chain 33) or an external storage medium (e.g. an identity document 20, a token or a flash memory). For example, if the requested data cluster 62 is the user's identity data, the processing module 100 may extract the digital signature 61 of the identity document 60 from the identity data.

In one embodiment, the provider-end computer apparatus 10 or the foregoing external apparatus may generate the digital signature 61 exclusive to the data cluster 62 by executing a digital-signature-generating process as described through Step S40-S42 below in advance (e.g. before the request of data is issued) or in a real-time manner (e.g. upon reception of the request of data).

In Step S40, the processing module 100 or the foregoing external apparatus retrieves private key. The way to obtain a private key is well known to people of ordinary skill in the art of information security, and is not redundantly detailed herein.

In Step S41, the processing module 100 or the foregoing external apparatus executes a fingerprint process (i.e. the second fingerprint process) on the data cluster 62 for obtaining trusty collective data fingerprint.

In Step S42, the processing module 100 or the foregoing external apparatus uses the private key to encrypt the trusty collective data fingerprint for obtaining the digital signature 61.

Thereby, the present invention may generate a digital signature 61 for any type of data clusters 62.

In Step S305, the processing module 100 groups the data cluster 62 according to the request of data 63, so as to extract the requested part 64 (including sub-data A1, sub-data A2 . . . ) and the unrequested part 65 (including sub-data B1, sub-data B2 . . . ) that includes everything other than the requested part 64. Additionally, the processing module 100 executes a fingerprint process (i.e. the first fingerprint process) on the unrequested part 65 for obtaining the unrequested data fingerprint 66.

In one embodiment, the processing module 100 may execute Steps S50-S51 to apply a fingerprint process to the unrequested part of the data cluster.

In Step S50, the processing module 100 executes a fingerprint process (i.e. the third fingerprint process) on the sub-data B1, B2 . . . of the unrequested part 65, respectively, for obtaining a plurality of sub-data fingerprints B1', B2' . . . of the unrequested part 65.

In Step S51, the processing module 100 uses a plurality of sub-data fingerprint B1', B2' of the unrequested part 65 as the unrequested data fingerprint 66.

In Step S306, the processing module 100 executes a reversible encryption process on the sub-data A1, A2 . . . of the requested part 64 of the data cluster 62. The foregoing reversible encryption process is well known to people of ordinary skill in the art of information security, and is not redundantly detailed herein.

In one embodiment, the processing module 100 does not execute a reversible encryption process on the requested part 64 of the data cluster 62, which means that the requested part 64 of the data cluster is transferred as plaintext.

In Step S307, the processing module 100 returns the requested part of the data cluster 64 that has been reversibly encrypted, the irreversibly encrypted unrequested data fingerprint 66 and the digital signature 61 to the request-end computer apparatus 32.

In one embodiment, the processing module 100 adds the foregoing data to the return data 67, which has been reversibly encrypted or not, without limitation), and transferring the return data 67 to the request-end computer apparatus 32.

In Step S308, the processing module 320 of the request-end computer apparatus 32 retrieves the public key 76.

The way to obtain a public key is well known to people of ordinary skill in the art of information security, and is not redundantly detailed herein.

It is worthy to be noted that the foregoing private key and the public key are paired, and used for encryption and decryption, respectively. For example, the data encrypted using the private key can be decrypted using the public key.

In Step S309, the processing module 320 analyzes (optionally including decryption) the return data 67 so as to extract a plurality of sub-data A1, A2 . . . of the requested part 70, a plurality of sub-data fingerprint B1', B2' . . . of the unrequested data fingerprint 72 and the digital signature 75. Additionally, the processing module 320 uses the public key 76 to decrypt the digital signature 75, so as to retrieve the trusty collective data fingerprint 77.

In Step S310, the processing module 320 executes a fingerprint process (i.e. the first fingerprint process) on the unencrypted requested part of the data cluster 70 for obtaining request data fingerprint 71.

Specifically, the processing module 320 executes a fingerprint process (optionally including hashing) on the sub-data A1, A2 . . . of the requested part of the data cluster 70, respectively, so as to obtain a plurality of sub-data fingerprint A1', A2' . . . (e.g. plural hash values), and uses the sub-data fingerprint A1', A2' . . . as the request data fingerprint 71.

In one embodiment, if the requested part of the data cluster 70 has been encrypted, the decryption process corresponding to the reversible encryption process is first executed on the encrypted request part 70 for obtaining the unencrypted requested part of the data cluster 70, and then the fingerprint process is executed on the unencrypted requested part of the data cluster 70.

In Step S311, the processing module 320 executes a merging process on the unrequested data fingerprint 72 and the request data fingerprint 71 for obtaining merged collective data fingerprint 74.

In one embodiment, the processing module 320 first assembles a plurality of sub-data fingerprint A1', A2' . . . of request data fingerprint 71 and a plurality of sub-data fingerprint B1', B2' . . . of the unrequested data fingerprint 72 into assembled data 73 (by, for example, s montaging all the hash values), and then executes a merging process (that may include hashing) on the assembled data 73 for obtaining the merged collective data fingerprint 74. In other words, the merged collective data fingerprint 74 is used to verify the assembled data 73.

It is worthy to be noted that, the foregoing first fingerprint process, the second fingerprint process, the third fingerprint process and the merging process may be identical or different types of encryption, but they have all to be irreversible encryption.

In one embodiment, first fingerprint process, second fingerprint process, third fingerprint process and merging process including hashing.

In Step S312, the processing module 320 determines whether the merged collective data fingerprint 74 is consistent with trusty collective data fingerprint 77 (i.e. whether the two hash values are the same).

If the merged collective data fingerprint 74 is consistent with the trusty collective data fingerprint 77, the processing module 320 executes Step S313. Otherwise, the processing module 320 executes Step S314.

In Step S313, the processing module 320 determines that the requested part of the data cluster 50 of the data cluster 40 it receives is accurate and correct, and further shows a "data correct" prompt through the man-machine interface 324.

In Step S314, the processing module 320 determines that the requested part of the data cluster 50 of the data cluster 40 it receives is incorrect or incomplete, and further shows a "data error" prompt through the man-machine interface 324.

While in the above description the private key is used for encryption to generate the digital signature and then the public key is used to decrypt the digital signature, there is another embodiment where the public key is used for encryption to generate the digital signature, and then the private key is used to decrypt the digital signature, without limitation.

Thereby, the present invention may use collective certificate technology to achieve verification of partial data.

The present invention has been described with reference to the preferred embodiments and it is understood that the embodiments are not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

What is claimed is:
1. A data verification system, comprising:
   a provider-end computer apparatus and a request-end computer apparatus, wherein the provider-end computer apparatus is configured to:
receive a request of data from the request-end computer apparatus, wherein the request of data requests for provision of a requested part of a data cluster;
retrieve the data cluster designated in the request of data;
execute a first fingerprint process on an unrequested part of the data cluster, which includes everything in the data cluster other than the requested part to obtain an unrequested data fingerprint; and
return the requested part of the data cluster and the unrequested data fingerprint to the request-end computer apparatus; and the request-end computer apparatus is configured to:
retrieve a trusty collective data fingerprint of the data cluster, wherein the trusty collective data fingerprint is generated based on the entire data cluster;
execute the first fingerprint process on the requested part of the data cluster for obtaining a request data fingerprint;
execute a merging process on the unrequested data fingerprint and the request data fingerprint for obtaining a merged collective data fingerprint; and
determine that the requested part of the data cluster is correct when the merged collective data fingerprint is consistent with the trusty collective data fingerprint.

2. The data verification system of claim 1, further comprising an apparatus configured to execute a digital-signature-generating process to generate a digital signature exclusive to the data cluster, wherein the provider-end computer apparatus is further configured to return the requested part of the data cluster, the unrequested data fingerprint and the digital signature to the request-end computer apparatus.

3. The data verification system of claim 2, wherein the request-end computer apparatus is further configured to:
retrieve one of a public key and a private key; and
use the retrieved public or private key to decrypt the digital signature to retrieve the trusty collective data fingerprint.

4. The data verification system of claim 3, wherein the digital-signature-generating process comprises:
retrieving the other one of the public key and the private key, wherein the private key and the public key are paired;
executing a second fingerprint process on the data cluster for obtaining the trusty collective data fingerprint; and
encrypting the trusty collective data fingerprint using the retrieved public key or private key for obtaining the digital signature.

5. The data verification system of claim 4, wherein the first fingerprint process, the second fingerprint process, and the merging process including hashing.

6. The data verification system of claim 1, wherein the provider-end computer apparatus is further configured to:
retrieve a user's identity data from a computing unit of an identity document as the data cluster; and
retrieve a digital signature from the computing unit.

7. The data verification system of claim 1, wherein the provider-end computer apparatus is further configured to:
photograph an identity data page of an identity document for obtaining an identity image;
execute a recognition process on the identity image for obtaining identity data and using the identity data as the data cluster; and
retrieve a digital signature from a computing unit of the identity document.

8. The data verification system of claim 1, wherein the data cluster includes a plurality of sub-data, and the provider-end computer apparatus is further configured to:
execute a third fingerprint process on each said sub-data of the unrequested part of the data cluster for obtaining sub-data fingerprints of the unrequested part of the data cluster; and
use the sub-data fingerprints of the unrequested part of the data cluster as the unrequested data fingerprint.

9. The data verification system of claim 1, wherein:
the first fingerprint process and the merging process are irreversible encryption; and
after the provider-end computer apparatus retrieves the data cluster designated in the request of data, the provider-end computer apparatus is further configured to:
execute a reversible encryption process on the requested part of the data cluster; and
return the requested part of the data cluster after reversible encryption and the unrequested data fingerprint after irreversible encryption to the request-end apparatus.

10. The data verification system of claim 1, after the provider-end computer apparatus receives the request of data from the request-end apparatus, the provider-end computer apparatus is further configured to:
execute a request-end verification process on a request-end digital signature of the request of data; and
retrieve the data cluster when the request for data passes the request-end verification process.

* * * * *